May 28, 1963 W. C. RIVERS 3,091,493
VEHICLE BODY STRUCTURE FOR A TRUCK OR SEMI-TRAILER
Original Filed March 13, 1957 3 Sheets-Sheet 1

INVENTOR
William C. Rivers
BY George H. Baldwin
ATTORNEY

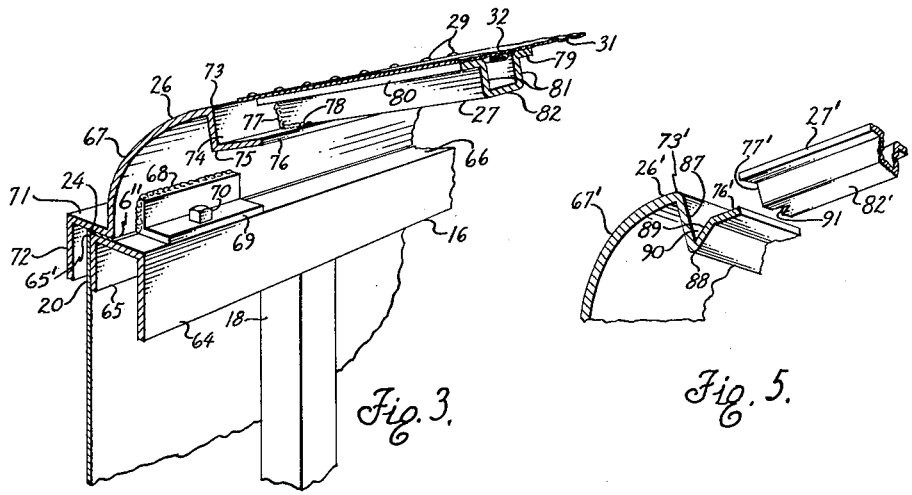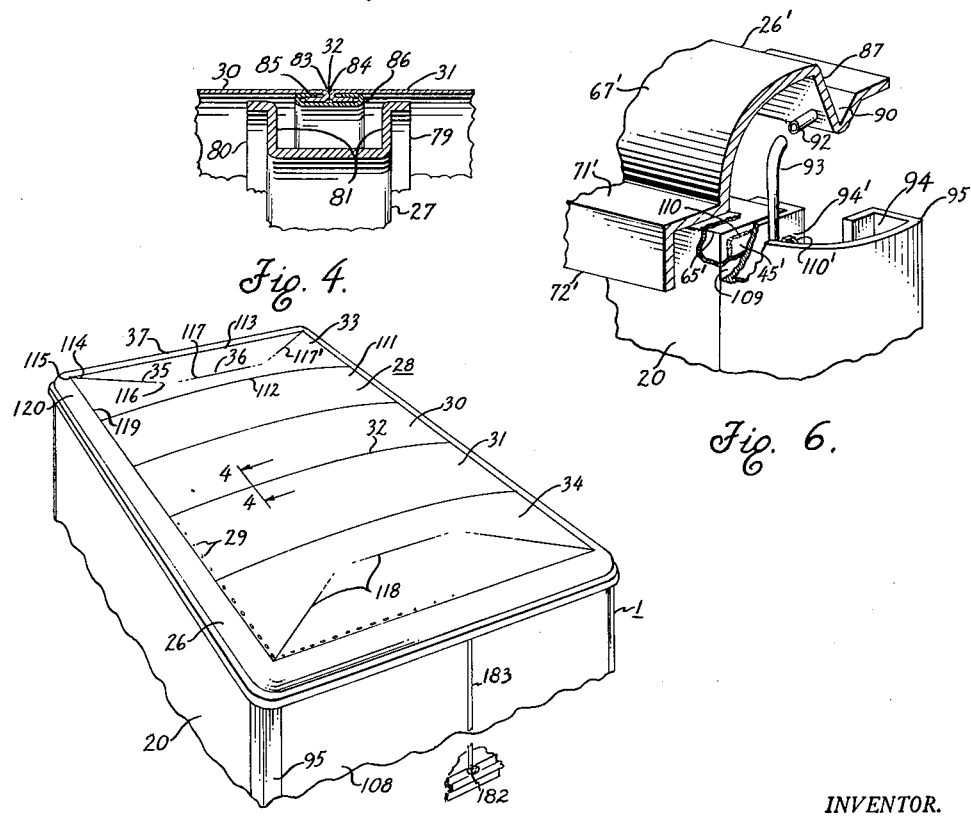

May 28, 1963 W. C. RIVERS 3,091,493
VEHICLE BODY STRUCTURE FOR A TRUCK OR SEMI-TRAILER
Original Filed March 13, 1957 3 Sheets-Sheet 3

INVENTOR.
William C. Rivers
BY
George H. Baldwin
ATTORNEY

United States Patent Office 3,091,493
Patented May 28, 1963

3,091,493
VEHICLE BODY STRUCTURE FOR A TRUCK
OR SEMI-TRAILER
William C. Rivers, P.O. Box 2239, Jacksonville, Fla.
Continuation of application Ser. No. 645,775, Mar. 13, 1957. This application Nov. 17, 1960, Ser. No. 70,081
16 Claims. (Cl. 296—28)

This invention relates to van or truck bodies, trailer and semi-trailer bodies and the like.

An object of the invention is to provide a van body of improved construction. A particular object of the invention is to adapt a van or truck body construction to ready assembly of the parts into a complete body at the factory and for, alternatively, shipment of the portions of the body from the factory for assembly at outlying assembly plants.

In accord with one aspect of the invention, a top rail of novel formation is employed to yield several advantages. One object of the invention is to provide a top rail which may be applied to side and end wall lintels to form a weatherproof joint therewith without the maintenance of precise manufacturing tolerances, whereby, for example, the top rail may be preassembled into the generally rectangular form of the roof and then applied to the lintel of the preassembled side and end walls of the body without the necessity of maintaining a high degree of precision in the dimensions of the preassembled top rail and the preassembled walls and lintel.

A specific object of the invention, according to certain modifications thereof, is to reduce the likelihood of water reaching the insulation in an insulated van body. In accord with this aspect of the invention, an improved internal drainage system is provided to catch water which may leak into the body through roof seams or joints, preferably coupled with a novel shield and drain system for preventing road spray from entering the body and for draining any such spray as might make its way around the shield. While such gutter, drainage and shield means are of particular importance in bodies to be insulated, it will be understood that they may be applied with advantage in any body whether or not it is to be insulated.

In van bodies having tops formed of several joined sheets of metal there is always a chance of leakage through the joints. A further chance of leakage exists along the joints at the edges of the roof. Drainage means are, in accord with certain features of this invention, incorporated in the structural or frame members, including the top rail and roof ribs, effective to receive leakage water entering such joints, to collect such water, and to dispose of the water exteriorly.

A further object of the invention is to provide a sheet metal top formation to fit over arched roof beams and further to fit against straight, rather than arched or bowed, side, front and back top rail sections.

An additional object is to provide a connection between a lower side wall structural member and floor beams of improved rigidity and simplicity, in which assembly and disassembly are more quickly and easily accomplished.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 3 is a perspective detail view of a small broken away section of the top rail and a roof beam, lintel and wall post and associated elements, on approximately the scale of FIG. 2;

FIG. 4 is a sectional view taken along line 4—4 of FIG. 9, on a much enlarged scale, showing details of the method of joining individual sheets of the roof covering;

FIG. 5 is a detail view, partially broken away, on approximately the scale of FIG. 3, of a modified top rail and a modified roof beam, providing drainage in accord with an important aspect of the invention;

FIG. 6 is a partially broken away detail view of the upper right hand corner of a van body incorporating the modified top rail of FIG. 5;

Figure 1:
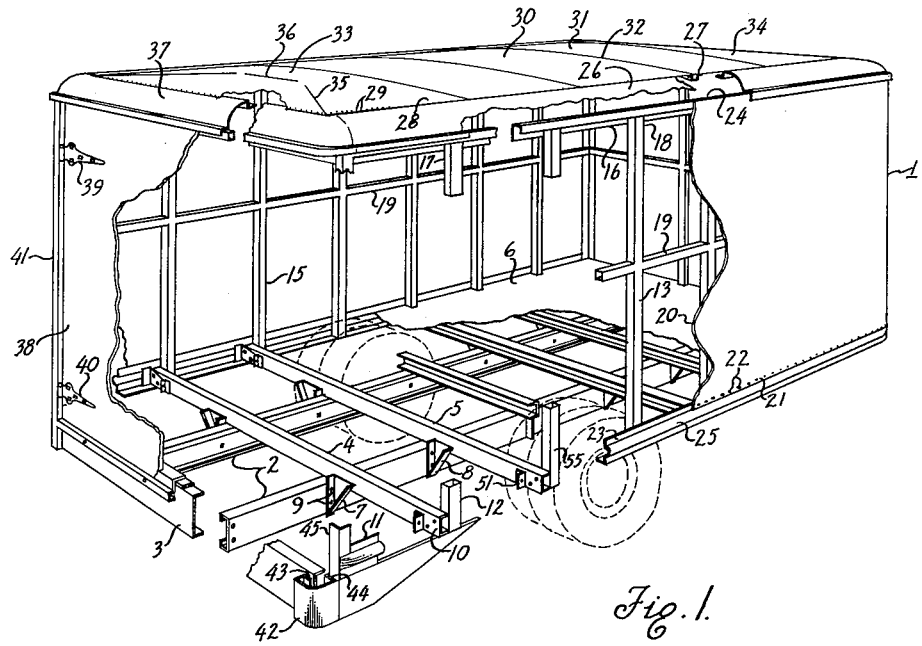
FIG. 1 is a perspective view, partially broken away, of a truck or van body embodying the invention.
Figure 7:
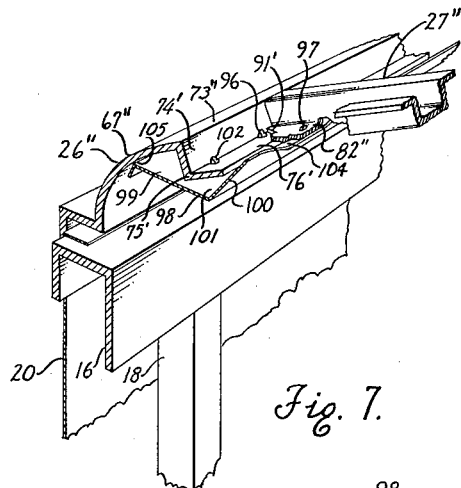
FIG. 7 is a partially broken away detail view of a second modification of the top rail arrangement.
Figure 8:
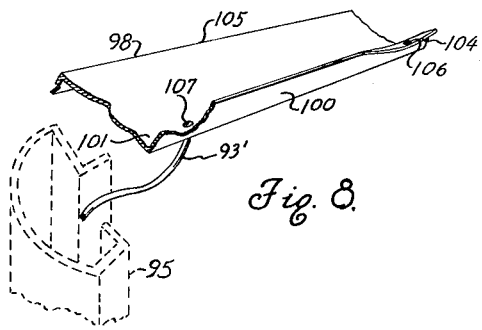
FIG. 8 is a partially broken away detail view of a gutter element embodied in the second modification of the top rail arrangement, taken on a scale larger than the scale of FIG. 7, applicable to the portion of the gutter adjacent the right front corner of the van body.
Figure 10:
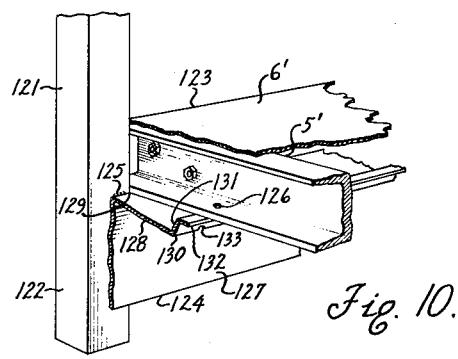

FIG. 9 is a perspective view, on the approximate scale of FIG. 1, showing roof portions of the body and applicable to each of the modifications of FIGS. 1 through 8; and FIG. 10 is a partially broken away detail view on approximately the scale of FIG. 7, of a lower side edge portion of a van body showing a road spray or splash shield particularly adapted for use in insulated van bodies embodying the gutter arrangement of the types of FIGS. 5 and 6 or of FIGS. 7 and 8.

Figure 2:
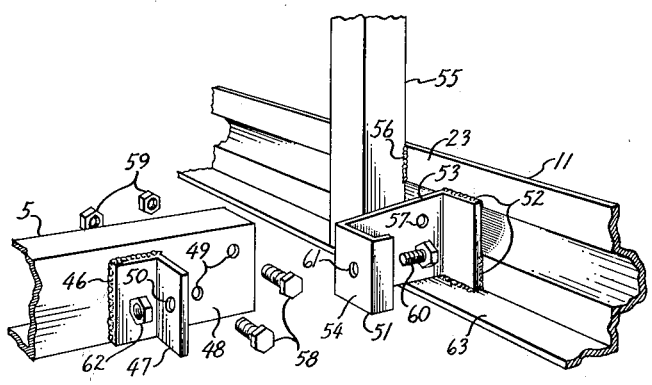
FIG. 2 is an exploded detail view on an enlarged scale showing a portion of an interconnected lower side wall rub rail structural member and wall post, together with the means for connecting a floor beam to the structural member.

As seen in FIG. 1, the van body 1 is constructed upon main longitudinal supporting girders 2 affixed at their ends to transverse end girders, such as girder 3, in a conventional manner. A plurality of floor beams 4, 5 are laid across the main girders 2 to support the flooring 6 and are attached by gussets, such as gussets 7 and 8, to the girders 2. The gussets may be welded, riveted or otherwise affixed to the floor beams and are preferably bolted by bolts 9 to the main girders. The end portions, such as portion 10, of the floor beams are connected to a longitudinal, preferably L-shaped structural member 11 which extends, preferably continuously, along each side and the front of the van body. Wall posts, such as posts 12, 13 and 15 are also, preferably, joined to the structural angle member 11, all as best shown in FIG. 2.

An inverted channel member 16 forms a lintel which extends across and which is joined to the upper end portions, such as portions 17 and 18 of the side wall posts. The side wall posts, together with horizontal side wall brace elements 19 which join the posts, may all be formed of box frame members as shown, preferably welded together, the wall posts being preferably welded to the lintel and to the lower angle member 11. A suitable wall covering or skin 20, which may be of thin sheet metal, is affixed at its lower edge 21 by means of rivets 22 externally of the upper portion 23 of member 11 while the upper edge 24 of the skin may be folded over the outer edge of lintel 16 as later described in connection with FIG. 3. Member 11, as shown, includes an outwardly projecting longitudinal rib portion 25 to serve as a rub face. A top rail 26, formed as later described, rests on and is attached to lintel 16 and defines a roof structure of the generally rectangular plan contours of the body 1. Roof beams or rafters, such as rafter 27, arch across the top and, as later described, are affixed at their ends to the top rail. A roof covering 28 rests on the roof beams and is affixed, such as by rivets 29, to the top rail. The roof covering 28 comprises a plurality of separate sheet metal sheets, such as intermediate sheets 30 and 31, having joints, such as joint 32, disposed directly over roof beams, whereby joint 32 is, for example, directly over beam 27. End sheets 33 and 34 are formed with shallow creases, such as creases 35 and 36 of sheet 33, in a manner such that the transversely extending or end top rail portions may be formed as straight rail sections, as will be clearly seen for rear and top rail portion 37 in FIG. 1.

Rear door 38 is shown as being hinged by hinges 39 and 40 to rear corner post 41. A similar rear corner post 42 is arranged at the opposite rear corner, having a flange 43 joined to end girder 3 and also having a flange portion 44 joined to an angle member end side wall post 45. The method of attachment of the floor beams to the side walls, which provides support for the walls and roof of the body, is shown in detail in FIG. 2. As shown therein, the floor beam 5 has attached, by means of weld 46, a rigid lug 47 extending outwardly at right angles to the end face portions 48 of the beam, and this portion includes bolt holes 49, while the lug 47 includes a bolt hole 50. An inwardly extending angle member bracket 51 is welded at 52 to structural member 11 and comprises an inwardly extending plate portion 53 and an end flange 54, the flange 54 lying in a plane generally parallel to the vertical plane defined by the structural member and being, as shown, spaced inwardly of member 11. Side wall post 55 is seen to be welded to member 11 by weld 56, the post being spaced slightly from plate portion 53 of angle member 51. Both holes, such as hole 57, are formed in plate portion 53 to align with holes 49 of the end portion 48 of floor beam 5 when beam 5 is positioned between side wall beam 55 and the plate portion 53. Bolts 58 are then extended first through the holes 57 and then through the holes 49, receiving nuts 59 and rigidly holding the end face 48 against plate 53. A bolt 60 is arranged to pass through bolt hole 61 in end flange portion 54 of the angle member and thence through hole 50 of lug 47 to receive nut 62. The drawing together of lug 47 and flange portion 54 by bolt 60 greatly reduces any tendency of the end portion 48 to move along or to twist against plate portion 53 of the connecting bracket member 51 and provides a readily assembled and disassembleable though rigid connection between the lower side wall structural member 11 and the floor beams. When end portion 48 is brought into position between side wall post 55 and bracket 51, the floor beam preferably rests on horizontal inwardly extending flange or ledge portion 63 of the member 11, thus providing support during the bolting together of the parts and adding further rigidity to the connection.

FIG. 3 shows in detail the arrangement of the top rail in connection with the roof and side wall elements. The upper end 18 of a side wall post extends into and is capped by and joined to lintel 16, the lintel being in the form of an inverted channel member having inner and outer downturned edge flanges 64 and 65, respectively. The wall post preferably abuts against the horizontal top 66 of the lintel. Top rail 26 includes an upwardly and inwardly curved or arcuate body portion 67 to the inner side of which is joined, such as by weld 68, a mounting lug 69 lying against top portion 66 of the lintel and rigidly fixed thereto by a bolt 70. Body portion 67 joins at its lower edge 6″ which is spaced inwardly of the outer edge 65′ of the lintel top, a horizontal base portion 71 which is substantially aligned with mounting lug 69 and which extends outwardly beyond the outer edge 65′ of the lintel to join or terminate in a downwardly extending drip and rub flange 72 spaced outwardly of the side wall skin 20. The skin 20 extends up along flange 65 of lintel 16 at its upper edge and at its upper end portion 24 folds around edge 65′ and extends inwardly between base portion 71 of the top rail and top portion 66 of the lintel forming a tight joint therebetween, the joint being held tight by bolt 70.

The upper inner edge portion 73 of body portion 67 of the top rail joins a downwardly, and preferably slightly inwardly extended roof rafter end abutment flange portion 74, which, in turn, is joined along its lower edge 75 to an inwardly and very slightly upwardly extending lip 76. Roof beam or rafter 27 has its end 77 in abutment with flange 74 and is welded by welds 78 preferably to flange 74 and lip 76. Rafter 27 comprises outwardly extending upper flanges 79 and 80 joined to the side walls 81 of the channel member which comprises the roof beam 27, and side walls 81 form with bottom 82 a watertight trough underlying roof skin joint 32. The sheets of the roof skin, such as sheet 31, extend a short distance onto the upper inner edge portion, or roof joint surface 73 of body portion 26 of the top rail, being joined thereto by means of rivets 29. The portion 73 extends inwardly and upwardly at an angle of about two degrees to the horizontal, or less than about 5 degrees, to align substantially with the arch of the roof beams.

Details of the roof sheet joints are shown in FIG. 4, wherein the meeting edges 83 and 84 of adjoining sheets 30 and 31 are folded back on themselves as at 85 and engaged within a clincher strip 86 which wraps or folds snugly against the folds. The clincher strip is disposed completely within or between the side walls 81 of the rafter 27, while the flanges 79 and 80 furnish support for the sheets 31 and 30, respectively, avoiding sharp edges which might cut the sheets. It will be seen that any moisture which penetrates the joint 32 is trapped in the rafter 27.

It will be understood that suitable sealing compound may be employed in accord with present known practice in and around skin joints to reduce leakage. However, even though such compounds are employed, leakage tends to occur because of incomplete application of or air holes in the compound, due to drying out of the compound, or as a result of working of the members at the joints, external damage or loosening of the rivets or clincher strips, or from like causes.

A modification of the top rail and roof rafter arrangement of FIG. 3 is shown in FIGS. 5 and 6, while a second modification is shown in FIGS. 7 and 8. In each such modification provision is made for draining any water which may enter either through the roof sheet joints, such as joint 32 mentioned above, or through the peripheral riveted lap joint of the roof sheet edges with the upper body portion of the top rail. In accord with the detail view of FIG. 5, the top rail 26′, having a body portion 67′ similar and corresponding to body portion 67 of the top rail previously described, includes a roof rafter end abutment flange 87 which extends downwardly and slightly inwardly across the end 77′ of a roof beam 27′ and continues below the end of the roof beam to a lower edge 88, from which it extends upwardly and inwardly to form an inner gutter wall 89 whereby a gutter 90 is defined between walls 87 and 89 underlying the roof beam end 77′. The inner gutter wall joins an inwardly extending lip 76′ corresponding in function to lip 76 of the previously described top rail. Roof beam or rafter 27′ is in all respects similar to roof rafter 27 previously described with the exception that a drain notch 91 extends inwardly a short distance into lower wall 82′ from the end 77′ of the rafter. It will be apparent that, if water collects in rafter 27′, such water will drain through notch 91 into gutter 90, and since a rafter such as rafter 27′, according to this modification, underlies each of the joints between roof sheets, and since the rafters forming the roof, as indicated by the drawings, and as will be apparent from the end view of FIG. 9 and from my Patent No. 3,070,400, hereinafter set forth, showing the arched shape of the roof, are arched from end to end, any water entering the roof sheet joint will flow readily to one of the ends of the rafter. It will be understood that each end of each roof rafter is notched in accord with FIG. 5 in this modification, whereby there is provided at each end a conduit connecting between the trough of the roof beam and the gutter and effective to pass the water collected in the trough downwardly into the gutter. The roof skin is attached by rivets to the uppermost surface portion 73' of body portion 67' of the top rail as previously described in connection with corresponding parts in FIG. 3, and it will be further readily understood that any water entering under the roof sheets at the lap joint with portion 73' will flow downwardly along rafter end abutment flange 87 and will be directed by the flange into gutter 90.

FIG. 6 shows details of the right front corner post arrangement of the van body in accord with the modification of FIGS. 5 and 6. Since it is common practice to load the forward ends of vans somewhat more heavily than the rearward ends, and since in loading and unloading from the rear the front end of a van is first loaded and last unloaded, the front end of the van is usually lower than the rearward end. Furthermore, because of the normal crowning of roadways, the right hand side of a van is usually lower than the left hand side. Accordingly, the right hand front corner of the van body is, for the greater part of the time, the lowest of the corners. Due to these factors, water collecting in the gutter 90 of the top rail 26' shown in FIG. 5 will flow along the top rail toward the right hand front corner. At this point, as shown in FIG. 6, a drain tube or coupling 92 extends into the gutter 90 through one of the gutter walls, such as through the roof beam end abutment flange 87 of the top rail 26'. A tube 93 fits to the drain tube 90 and extends down through the hollow interior 94 of the right front corner post 95, emptying through the lower end of the post exteriorly of the van body. Tube 93 is conveniently formed of synthetic plastic or rubber, although a metal tube is equally satisfactory.

FIG. 6 shows further details of the modified top rail 26', and it will be seen that this rail corresponds to the rail shown in FIG. 3 in having a base portion 71' extending outwardly from the lower edge of body portion 67' and in having a drip flange 72' disposed outwardly of side wall skin 20. In other respects not specifically pointed out, the modified construction of the top rail and associated elements of FIGS. 5 and 6 correspond with the construction heretofore shown and described in connection with FIGS. 1 through 4.

FIGS. 7 and 8 disclose a further or second modification of the portions of the body associated with the top rail wherein gutter means are incorporated. The arrangement according to FIG. 7 includes top rail means 26" which is generally similar to the rail 26 of FIG. 3 with the exception that drain conduits in the form of holes 96 and 102 are drilled or otherwise formed through an appropriate lower portion of the beam end abutment flange 74' or through the lip portion 76', or through both portions, at approximately the position of the joining fold 75' and so located that water draining along the lower wall 82" of the roof beam 27" and draining therefrom through a conduit portion or notch 91' may pass freely through the opening 96, and in that a gutter element 98 is included in the top rail means. An appropriate opening 96 is formed in the top rail at each end of each roof beam. Accordingly the roof beams 27" may correspond precisely with the beams 27' as shown in FIG. 5, notches 91' of the former corresponding to notches 91 of the latter. An additional small opening may be provided in the lower wall 82" of the roof beam 27", however, to receive a bolt 97 by means of which the underlying sheet metal gutter member 98 is attached in place to constitute an integral part of the top rail means. The gutter member 98 is separately shown in FIG. 8 and preferably comprises a metal sheet element extending the complete length of the top rail all the way around the body and including angularly related plate portions 99 and 100, respectively. These portions form a gutter trough 101, in which water passing down a roof beam and through a roof beam trough drain conduit, comprising notch 91' and an opening 96, may collect. Additional openings, such as opening 102, may be provided through lip 76', or through flange 74', or through both, at approximately the fold 75', such openings 102 being located between roof beams and being arranged to conduct any small amount of water which may enter between the top rail and the thereto attached roof skin into gutter 101. Thus, water entering the lap joint at 73" is directed by flange 74' and lip 76' and conduit opening 102 into the gutter.

The gutter member 98 is preferably at least slightly resilient and it is mounted by bolts 97 to the roof rafters by bending inwardly and downwardly portions, such as portion 104, of the inner gutter wall portion 100 of the member at each roof beam. Such bending of the wall portion 100 tends to force the outer edge 105 upwardly against body portion 67" of the top rail sufficiently securely to prevent sloshing of water therebetween. An opening 106 is provided in portion 104 to receive bolt 97 by means of which the gutter element 98 is held in place. Water collected in gutter 101 drains through opening 107 and into a tube 93' which extends down through the right hand front corner post 95 of the body in accord with the principles and constructions hereinabove described in connection with FIG. 6. The wall skin or covering 20, the lintel 16 and the upper end 18 of the wall post may all be precisely in accord with the description hereinabove given in connection with the previously described figures.

An overall view of the upper portions of the van body, applicable to the preferred embodiment of FIGS. 1 through 4, as well as to the modifications of FIGS. 5 and 6 and FIGS. 7 and 8, is shown in FIG. 9. The top rail 26 is seen to extend peripherally around the van body 1 and roof covering 28 is attached thereon by rivets 29. The side wall skin 20, and the front wall skin 108 which is similarly arranged, are attached by folding inwardly around the end post of the wall, such as the post 45 of FIG. 1, an edge portion of the skin, such as between post 45 and flange 44 of corner post 42 of FIG. 1. In FIG. 6, the forward edge portion 109 of wall skin 20 is folded in between the forward angle member wall post 45' and flange 94' of post 95. Post 45' is joined to the lintel 16 by a weld 110, while bolt 110' attaches flange 94' to post 45' squeezing the skin portion 109 therebetween. Similar skin joints are provided at each corner post.

The roof skin as shown comprises three intermediate panels 30, 31 and 111 joined edge to edge such as by joint 32 previously described and shown in detail in FIG. 4. These intermediate sheets may be precisely rectangular, and each arches between the top rails at opposite sides of the body. Each of the end sheets 33 and 34 has an inner edge, such as edge 112 of sheet 33 which conforms to the arch of the adjoining intermediate sheet, such as sheet 111, but along its opposite edge 113 the end sheet 33 meets a straight rear end section 37 of the top rail. The sheet 33 is conformed along its edges 112 and 113, to be arched along the first but flat and straight along the latter, by means of shallow creases or angle breaks 35 and 36 formed in the sheet. The crease 35 which extends inwardly from corner 115 at one end of edge 113 is sharper at its portion 114 adjacent the rear corner 115 of the sheet than it is toward its end 116 at which it approaches the line of crease 36. Similarly, break 36, which extends parallel to edge 112 and which is spaced between edges 112 and 113, and preferably spaced less than one-half of the distance between edges 112 and 113 from edge 112, tapers to flatness toward its end 117 at which it approaches crease 35. This description is, of course, equally applicable to the third crease 117' of the sheet 33 which corresponds to crease 35, and, of course, the description is similarly pertinent to the corresponding creases, such as creases 118, of the front sheet 34 of the roof covering. It has been found that these creases need be only about two degrees at their sharpest, tapering to no crease as they approach the lines of each other, whereby each break or crease terminates entirely before intersecting the line of either of the other two breaks of the sheet. With the creases, the sheet edge 113 at the end of the body lies snugly and flat against straight portion 37 of the top rail, while the side edges, such as edge 119, lie flat against the side portion 120 of the top rail. The creases or breaks 35, 36, 117' and 118 may be formed by a cornice break.

The modifications of FIGS. 5 and 6 and of FIGS. 7 and 8 are particularly desirable and applicable to van bodies which are to be internally insulated, to prevent any accumulation of moisture in the insulating material. It has been found that road spray or splash from the wheels of insulated vans tends to enter the body and to wet the insulation. Insulated vans often comprise side wall skirts which extend a few inches or a foot or two below the floor level of the body and FIG. 10 is pertinent to such construction. A wall post 121 is shown therein extending, at 122 substantially below the flooring 6' of the body. The floor beams 5' in this construction will be understood to support the flooring 6' and to be attached to the wall post 121 in a suitable manner, such as has been hereinabove described. In order to prevent the splash from the wheels, or otherwise, from passing upwardly above the outer edge 123 of flooring 6', splash shield 124, of angular shape, is disposed under the floor beams 5' and against the lower portions 122 of the wall posts. Suitable welding 125 may join the splash shield to the wall posts, or the splash shield may be connected by means of bolts, such as bolt 126, to the floor beams. The splash shield comprises a generally vertical wall portion 127 which lies flat against the wall posts and an inwardly and slightly downwardly directed gutter wall plate 128 extending inwardly from the juncture 129 between the floor beam and the wall post. At an inner lower edge 130 the member is folded upwardly to provide an inner gutter wall portion 131 which may carry a mounting flange 132 engaging floor beam 5' and attached thereto by means of bolt 126. Restricted drain openings, such as opening 133, are drilled through the gutter portions of the member 124 to permit water collecting above fold 130 to drain readily therefrom but the opening is sufficiently small to prevent any substantial amount of road spray from passing up into the gutter.

A rear door arrangement for the body is described in my Patent No. 3,070,400, such arrangement differing in certain respects from the door arrangement of FIG. 1 herein and being particularly adapted for use when it is desired that the doors expose the full width of the inside of the body, to facilitate loading and unloading, or when it is desired that the doors be swingable through about 270 degrees to lie flat against the outer side wall and thus substantially completely out of the way, when open.

A signal light or lamp, described in my application Serial No. 17,680, filed March 25, 1960, entitled Van Body, now abandoned, is particularly adapted for use in conjunction with a top rail of any of the specific arrangements thereof, such as are shown in detail in FIGS. 3, 5 and 7 respectively.

Van bodies constructed in accord with the principles of this invention may be quickly and easily assembled in a factory either individually or on a production line basis, or they may be readily transported and stored in various stages of completion in body shops in local communities. For example, the top rail for the complete body may be completely preassembled into its final rectangular form before the parts of the body leave the factory, or the top rail may be shipped in pieces to the local assembly shop for welding together at the time the assembly is to be completed. Each side wall frame, including wall posts 17, 18 and brace elements 19, lintel 16 and longitudinal rib portion 25, is preferably preassembled at the factory, although skin 20 may be riveted by rivets 22 to the longitudinal rib or structural member 25 either at the factory or upon final assembly. Similarly, the preformed roof sheets, including the end sheets with appropriate breaks, such as breaks 35 and 36, may be shipped to the local assembly point separately, or the roof covering, the roof beams and the top rails may be formed at the factory into a complete subassembly prior to shipment to the local assembly shop.

The problems which have been experienced in properly sealing and protecting the joints of side wall skin to top rail in van bodies are greatly reduced by the top rail arrangements shown herein. Furthermore, the gutter provisions in the top rail means shown in the modifications of FIGS. 5 through 8 substantially eliminate the damaging entry of water into the van body, a particularly serious problem in connection with bodies lined with heat insulating materials. The top rail arrangements herein shown have the further advantages of simplicity, attractive external appearance, rigidity and strength. The top rail shape of each of the embodiments provides simple and rigid assembly and support of the roof beams, the roof skin, and the upper end of the side wall skin, and facilitates mounting of the top rail to the lintel. Specifically, as will be apparent from the drawings, after the top rail has been completely assembled into its final rectangular form corresponding to the plan configuration of the lintels and body as suggested above, it will fit on the lintel of the assembled body walls in a weathertight fit without the maintenance of precise tolerances in manufacture. Thus it is immaterial to the effectiveness of the connection of the rail and lintel whether the lower edge 6" of body portion 67 of the rail as seen in FIG. 3 is somewhat closer to or further from lintel edge 65', so long as edge 6" is spaced inwardly of lintel edge 65' by a distance sufficient to provide effective support to the rail and effective clamping of the upper end portion 24 of the skin.

This application is a continuation of my co-pending application Serial No. 645,775, filed March 13, 1957, and entitled Vehicle Body Structure for a Truck Semi-Trailer, now abandoned, and application Serial No. 17,679, filed March 25, 1960, entitled Van Body Door Construction, now Patent No. 3,070,400, is a division of application Serial No. 645,775.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a van body, a plurality of upstanding wall posts, a respective side wall lintel extending across and joined to the upper ends of said posts along each side of said body, end wall lintels joining said side wall lintels, each said lintel having an upwardly facing substantially flat and horizontal top and an outwardly facing side portion disposed outwardly of said posts, a sheet material skin lying against said outward faces of said lintel side portions and outwardly of said posts and having an upper edge portion joined to the respective said lintel, a top rail preassembled into the plan configuration of said joined lintels, said top rail extending along said lintels, said top rail having a substantially horizontal planar base portion disposed substantially parallel to and supported on said top of said lintels and extending horizontally outwardly of the plane of said skin to an outer edge disposed spacedly outwardly of the skin and lintels and having a downturned drip and rub flange spaced outwardly of the skin to provide a space therebetween joined along said outer edge whereby said preassembled top rail and said joined lintels may be preassembled independently without precise dimensional control and thereafter connected, said base portion having an inner edge portion overlying said top of said lintels, said top rail further comprising a body portion joined to and extending upwardly and inwardly from said inner edge portion of said base portion and terminating at its upper edge portion in a roof-rafter-connecting flange, releasable means removably attaching said rail to said lintels inwardly of said top rail whereby said top rail and said lintels are connected in watertight relation, roof rafters having end portions attached to said connecting flange, and a roof skin on said rafters overlying and fixed to said upper edge portion of said top rail body portion.

2. In a van body, upwardly opening channel member roof beams, a roof skin comprising sheets joined edge-to-edge along roof joints, said beams being disposed underlying and opening toward said joints and constituting leakage-water-receiving troughs for water leaking through said joints, top rail means including an upright flange closing the ends of said beams and constituting end walls of said troughs, said troughs having bottom walls spaced below said joints and side walls extending between said bottom walls and said roof skin on opposite sides of the respective joint and extending between said trough end walls, said top rail means comprising a gutter underlying the ends of said troughs, one of said trough walls at each end having an opening therethrough from a lower portion of the trough and draining into said gutter, and conduit means having an upper end opening into said gutter and having a lower end opening out of said body to drain water accumulated in said gutter.

3. In a van body, a roof rib comprising a trough member, top rail means supporting an end portion of said rib, said rail means comprising a gutter underlying said rib end portion, a drain conduit extending downwardly from the bottom of said trough at said end portion and communicating with said gutter, a roof skin supported by said rib and comprising two sheets joined edge-to-edge along a joint disposed over said trough, whereby leakage water passing through said joint is collected in said trough and drains therefrom through said drain conduit into said gutter, and a gutter draining conduit having an upper end opening to said gutter and a lower end opening out of said body operative to drain water from said gutter and to dispose of such water exteriorly of said body.

4. In a van body, a roof rib comprising a trough member, top rail means supporting an end portion of said rib, said means comprising a gutter underlying said rib end portion, drain conduit means extending downwardly from the bottom of said trough at said end portion and communicating with said gutter, a roof skin supported by said rib and comprising two sheets joined edge-to-edge along a joint disposed over said trough, whereby leakage water passing through said joint is collected in said trough and drains therefrom into said gutter, a drain conduit for said gutter opening out of said body, said body having a hollow right front corner post and a second corner post, said end portion of said rib being disposed between and spaced from said posts, said gutter extending from said rib end to said right front corner post, and said drain conduit extending downwardly from said gutter through the hollow interior of said right front corner post and out through the lower end thereof.

5. In a van body, a roof rib comprising a trough member, top rail means supporting an end portion of said rib, said rail means comprising a gutter underlying said rib end portion, a drain conduit extending downwardly from the bottom of said trough at said end portion and communicating with said gutter, a roof skin supported by said rib and comprising two sheets joined edge-to-edge along a joint disposed over said trough, whereby leakage water passing through said joint is collected in said trough and drains therefrom through said drain conduit into said gutter, and a gutter draining conduit having an upper end opening to said gutter and a lower end opening out of said body operative to drain water from said gutter and to dispose of such water exteriorly of said body, said top rail means having an upper portion disposed at a level above the level of said gutter, said sheets having outer edge portions lapped over said upper portion and joined thereto, said top rail means comprising means to direct into said gutter water leaking into said body between said outer edge portion of said sheets and said upper portion of said rail means.

6. The combination according to claim 3 wherein said top rail means comprises a rail member having a base portion with an inner edge, a body portion joined along said inner edge and extending upwardly and inwardly therefrom and terminating at an upper inner edge, a flange portion joined to said upper inner edge and extending downwardly therefrom to a level below said rib end portion and an inner portion joined to said flange portion below said rib end portion and extending upwardly and at an inward angle to said flange portion to form therewith said gutter.

7. The combination according to claim 6 wherein said inner portion of said rail member terminates upwardly in a lip and said lip is in supporting engagement with said rib end portion and wherein said flange portion is in engagement with said rib end portion and constitutes an end wall of said trough.

8. The combination according to claim 5 wherein said top rail means comprises a flange portion extending inwardly and downwardly from said upper portion of said rail means to a level below the level of said rib end portion, the lower portion of said flange portion constituting an outer wall of said gutter and the upper portions of said flange portion constituting said means to direct into said gutter water leaking into said body between said outer edge portions of said sheets and said upper portions of said rail means.

9. In combination in a van body having a wall lintel with a horizontal flat top terminating outwardly in an outer edge, a wall skin member having an upper end portion folded inwardly around said edge and onto the top of said lintel, a top rail member preassembled into the configuration in plan of the body, said top rail member comprising a horizontal base portion overlying and clampingly engaged against said skin member on said lintel and said rail extending horizontally outwardly of said outer edge of the lintel top to an outer edge of said base portion spaced outwardly of said lintel top outer edge and of said skin and having a downwardly directed drip flange spaced outwardly of said lintel top outer edge and of said skin whereby said preassembled top rail and body may be preassembled independently without precise dimensional control and thereafter connected, said flange being disposed outwardly of and spaced from said skin member to provide a space therebetween, said base portion having an inner edge spaced inwardly of the outer edge of said lintel top, said rail member further comprising a body portion joined at said inner edge to said base portion and extending upwardly and inwardly therefrom and terminating upwardly in a roof sheet attachment portion, a roof sheet attached to said attachment portion, and releasable means attached to said body portion inwardly thereof and to said lintel inwardly of the van body retaining said rail member on said lintel with said base portion clamping said upper end portion of said skin against said lintel top whereby said rail member and said lintel and said upper end portion of said skin are joined in water-tight relation.

10. In a van body having a floor supported on underlying floor beams, a hollow right front corner post, side wall posts having lower portions extending below said floor beams, and a top rail supported on said posts having a roof skin edge joined thereto along a roof skin edge joint, the combination of, a combination road spray shield and gutter element comprising an upright flange disposed inwardly of and against said wall posts below said beams and a plate portion having an outer edge joined to said flange immediately below said beams and extending inwardly and downwardly from its said outer edge and terminating inwardly in an upstanding lip extending upwardly to said beams, thereby to form a gutter, said plate portion having at least one restricted drain opening therethrough for draining said gutter, a top gutter in said body disposed at a level adjacent and below said roof skin edge joint, means to direct water leaking into said body through said joint into said top gutter, and means to drain water from said top gutter through said hollow corner post out of said body.

11. In a van body, a straight front top end rail section, a straight rear top end rail section, and straight side rail sections, a plurality of arched roof beams extending transversely of said body and spaced between said front and rear rail sections including a first beam and a second beam located between said first beam and said front rail section, a roof covering comprising a plurality of sheet metal sheets including two end sheets and at least one intermediate sheet, each said end sheet having one edge joined to a respective one of said end rails and an opposite edge overlying one of said roof beams, a respective intermediate sheet edge joined along said opposite edge of each said end sheet at the respective arched roof beam, each said end sheet having opposite side edges joined respectively to said side rail sections, each said end sheet having a respective shallow angle break therein extending from each end of said one edge thereof inwardly in a direction generally toward the center of said opposite edge of the respective sheet and gradually becoming more shallow with increasing distance inwardly of the sheet and a third shallow angle break extending parallel to said one edge of the sheet spaced between said one and the opposite edge thereof and of gradually decreasing angle toward the sides of the sheet, each said break of each sheet decreasing and terminating short of intersection with the line of either of the other two said breaks of the sheet.

12. In a van body, a floor beam having a vertical face, a lower structural member along the lower side wall edge, a bracket welded to said structural member comprising a plate portion extending inwardly from said member and a flange at the inner edge of said plate portion extending at right angles thereto, said beam having an end portion of its said face engaged and bolted against said plate portion, a rigid lug welded to said face extending therefrom parallel to and adjacent said flange, and a bolt engaging said lug and flange urging said lug toward engagement with said flange.

13. In a van body, a plurality of upstanding side wall posts, a side wall lintel extending across and joined to the upper ends of said posts, said lintel having an upwardly facing top and an outwardly facing side portion, a top rail extending along said lintel, said top rail having a base portion disposed substantially parallel to and on said top of said lintel and extending outwardly of said lintel side portion, said top rail further comprising an upwardly extending inwardly curved body portion joined to said base portion and terminating in an inner upper edge of said body portion, and said rail further forming an inner roof gutter inwardly of said inner upper edge, said gutter being formed by a further extension of said rail from said inner upper edge of said body portion downwardly to an acute angle bend forming the bottom of said gutter and thence upwardly and inwardly from said bend to form an inner wall of said gutter terminating inwardly in an upper edge of said gutter inner wall, said top rail terminating inwardly of said gutter in a roof-rafter supporting lip extending inwardly from said upper edge of said gutter inner wall, and drain conduit means communicating with said gutter and terminating exteriorly of said van body.

14. In a van body including a plurality of upstanding wall posts and a respective side wall lintel joined to the upper ends of said posts along each side of said body, each said lintel having an upwardly facing substantially flat and horizontal top and an outwardly facing substantially flat and vertical side portion disposed outwardly of said posts, a respective sheet material skin lying against said side portion of each said lintel and having an upper edge portion lying on said top of each said lintel, a respective roof rail extending along each said lintel, each said roof rail having a substantially horizontal planar base portion disposed substantially parallel to said top of each said lintel, means for attaching each said roof rail to its respective said lintel whereby said upper edge portion of said skin is clamped between said base portion of said roof rail and said top of said lintel to provide a watertight connection between said rail and skin and lintel, said base portion extending substantially horizontally outward of said skin to an outer edge spaced outwardly of said skin and having a downturned drip and rub flange spaced outwardly of said skin joined along said outer edge, said top rail further comprising a body portion extending upwardly and inwardly of said planar base portion, roof rafters extending across said van body between said roof rails, said body portion of each said roof rails terminating upwardly in a supporting portion for said roof rafters, said body portion having a lower edge portion joined to said planar base portion inwardly of said vertical side portion of said lintel whereby the load of said roof rafters is supported on said top of said lintels and on said upper ends of said posts.

15. The combination according to claim 14 wherein said means for attaching said roof rail to its respective said lintel comprises a lug extending inwardly of and affixed to said body portion and lying on said top of said lintel, and a fastener connecting said lug to said top of said lintel.

16. In a van body including a plurality of upstanding wall posts and a respective side wall lintel joined to the upper ends of said posts along each side of said body, each said lintel having an upwardly facing substantially flat and horizontal top and an outwardly facing substantially flat and vertical side portion disposed outwardly of said posts, a respective sheet material skin lying against said side portion of each said lintel and having an upper edge portion joined to each said lintel, a respective roof rail extending along each said lintel, each said roof rail having a substantially horizontal planar base portion disposed substantially parallel to said top of each said lintel, said base portion extending substantially horizontally outward of said skin to an outer edge spaced outwardly of said skin and having a downturned drip and rub flange spaced outwardly of said skin joined along said outer edge, said top rail further comprising a body portion extending upwardly and inwardly of said planar base portion, means for attaching each said rail to its respective said lintel inwardly of said body portion of each of said rail whereby each said rail is connected to each said lintel in watertight relation, roof rafters extending across said van body between said roof rails, said body portion of each said roof rails terminating upwardly in a supporting portion for said roof rafters, said body portion having a lower edge portion joined to said planar base portion inwardly of said vertical side portion of said lintel whereby the load of said roof rafters is supported on said top of said lintels and on said upper ends of said posts.

References Cited in the file of this patent

UNITED STATES PATENTS 2,600,140    Torseth _____ June 10, 1952

FOREIGN PATENTS 551,058    Belgium _____ Sept. 29, 1956
732,191    Great Britain _____ June 22, 1955